(12) United States Patent
Lundqvist

(10) Patent No.: US 6,332,048 B1
(45) Date of Patent: Dec. 18, 2001

(54) MODULATOR AND METHOD FOR MANUFACTURING OF SUCH A MODULATOR

(75) Inventor: Lennart Lundqvist, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/418,369

(22) Filed: Oct. 14, 1999

(30) Foreign Application Priority Data

Oct. 15, 1998 (SE) ................................................. 9803522

(51) Int. Cl.[7] ............................................................ G02F 1/035
(52) U.S. Cl. .......................................................... 385/2; 385/8
(58) Field of Search ............................................. 385/1–10

(56) References Cited

U.S. PATENT DOCUMENTS

| | | | |
|---|---|---|---|
| 4,199,221 | * | 4/1980 | Rivoallan et al. ...................... 385/8 |
| 4,913,506 | * | 4/1990 | Suzuki et al. ............................ 385/2 |
| 6,167,070 | * | 12/2000 | Sakata ..................................... 372/45 |

FOREIGN PATENT DOCUMENTS

| | | |
|---|---|---|
| 0 726 483 | 8/1996 | (EP) . |
| 0 809 129A2 | 11/1997 | (EP) . |
| 2 281 785 A | 3/1995 | (GB) . |
| 10-65275 | * 3/1998 | (JP) . |
| 10-163568 | * 6/1998 | (JP) . |
| 10-256669 | * 9/1998 | (JP) . |
| 10-275960 | * 10/1998 | (JP) . |

* cited by examiner

Primary Examiner—Rodney Bovernick
Assistant Examiner—Michelle R. Connelly-Cushwa
(74) Attorney, Agent, or Firm—Burns, Doane, Swecker & Mathis, L.L.P.

(57) ABSTRACT

Electro-absorption modulator (EAM), of the kind that includes a waveguide, for modulation of light, comprising a waveguide core, a waveguide cladding (42, 43, 52, 53), and an electrode (45, 55), the modulator being arranged to modulate light launched into the modulator as a response to a voltage being applied on the electrode. According to the invention, the width and/or the thickness of the waveguide core (41, 51) are/is varying along the length of the modulator. The width/thickness is smaller in the portion of the modulator where the light is intended to be input, for the purpose of reducing the absorption of the modulator there. A method in manufacturing of the modulator may utilize a tapered photolithography mask (46).

16 Claims, 3 Drawing Sheets

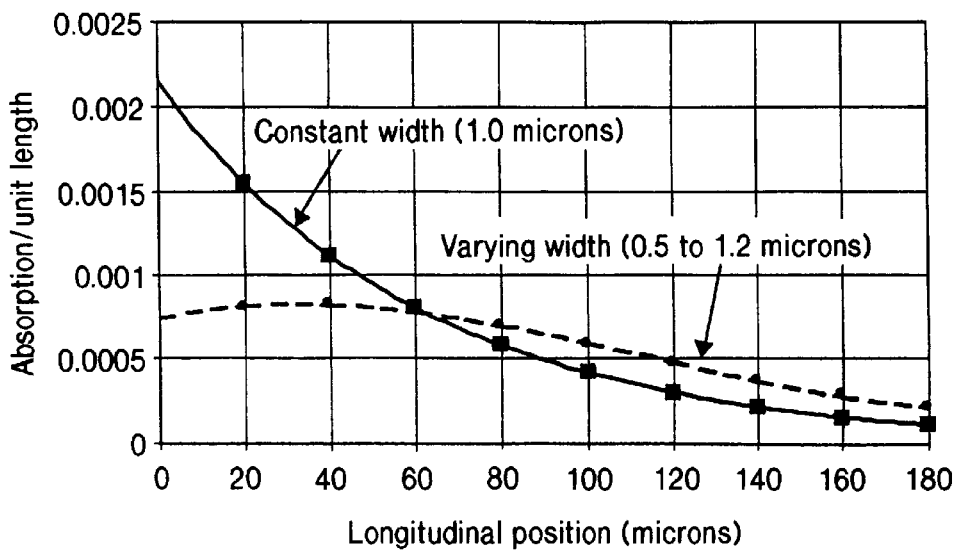
FIG. 3
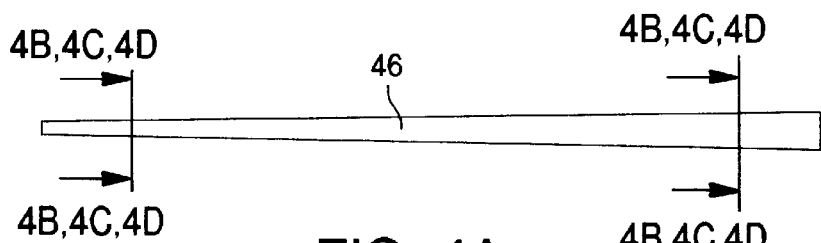
FIG. 4A
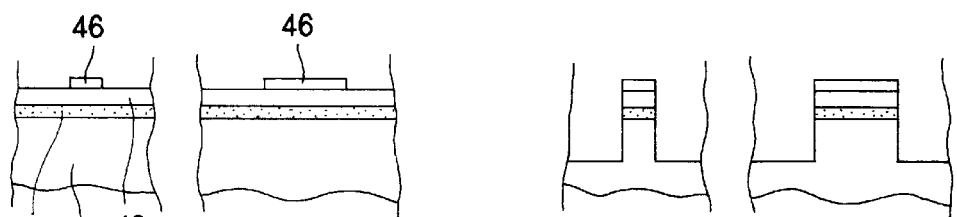
FIG. 4B
FIG. 4C
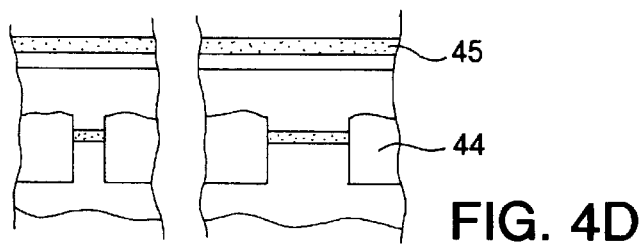
FIG. 4D

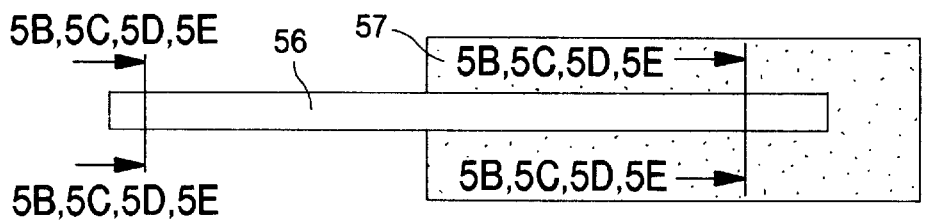
FIG. 5A
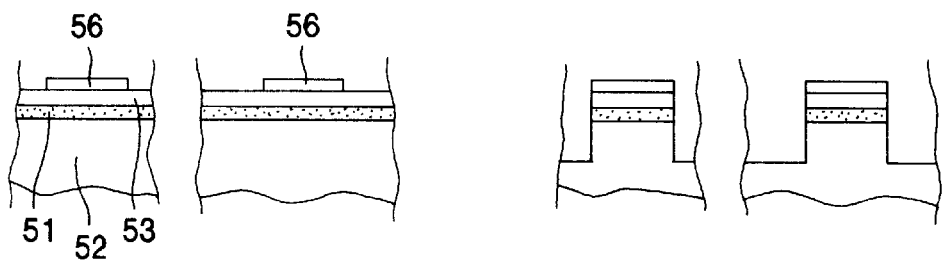
FIG. 5B
FIG. 5C
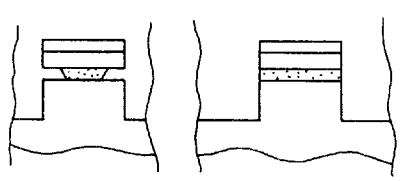
FIG. 5D
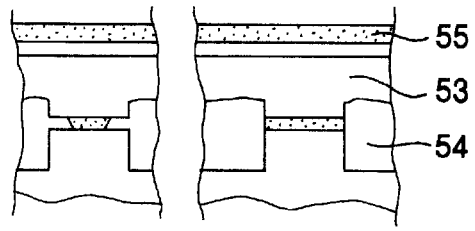
FIG. 5E

MODULATOR AND METHOD FOR MANUFACTURING OF SUCH A MODULATOR

This application claims priority under 35 U.S.C. §§119 and/or 365 to 9803522-3 filed in Sweden on Oct. 15, 1998; the entire content of which is hereby incorporated by reference.

TECHNICAL FIELD OF THE INVENTION

The present invention relates partly to an electro-absorption modulator, particularly with improved performance, partly to different methods for manufacturing of such an electro-absorption modulator.

DESCRIPTION OF RELATED ART

Electro-absorption modulators (EAM), particularly of the kind that includes a waveguide, and often monolithically integrated together with so-called DFB lasers (Distributed Feedback Lasers), is a very important component class for fiber optic transmission at high bit rates (typically 2,5 Gb/s and 10 Gb/s; in the future most likely 40 Gb/s) in combination with long-haul transmission.

The reason for this is that such EAM components have more ideal characteristics than, for instance, directly modulated lasers (specifically, they have less dynamic wavelength deviations, so-called chirp, during modulation). Furthermore, they are considerably simple to manufacture and require only a low driving voltage (compared to other classes of external optical modulators, such as, e.g., Mach-Zender modulators manufactured in lithium neobate). Not at least, the EAM component is very useful for applications including wavelength division multiplexing (WDM).

A conventional EAM component consists of a waveguide, with a waveguide core whose refractive index is higher than that of the surrounding, see for instance EP 0,809,129, EP 0,726,483, GB 2,281,785, and references therein. For components operating with launched light of a wavelength of 1.3 or 1.55 $\mu$m, the core consists typically of a semiconductor material, such as InGaAsP or alternating layers of InGaAsP and InP. The core is undoped or only slightly doped. Above and below the core, there are typically a p-doped InP layer and an n-doped InP layer, respectively, so that the complete structure composes a p-i-n diode.

The attenuation through the modulator depends on the difference in energy between the photons of the launched light and the band gap of the core. The band gap is affected, inter alia, by the electrical field applied. Thus, the p-i-n diode is arranged so that, when it is reverse biased, a large portion of the launched light is absorbed, whereby a photo current arises. Typically, extinction ratios of 10–30 dB may be achieved.

A problem in this respect is that the band gap is also strongly temperature dependent. The photo current that arises, causes ohmic heating, and thus a temperature rise, whereby the attenuation is affected. The absorptionen, which in a first approximation is proportional to the luminous power, is highest in the beginning of the modulator, i.e., where the light is launched into the modulator, whereby also the photo current is highest there. Thus, the strongest affection of the attenuation is achieved there.

SUMMARY OF THE INVENTION

To conceive how this temperature dependence may create problems in a digital transmission system, let us consider the following example. Suppose that one wants to send one or several consecutive "ones", preceded by a long sequence of "zeros". These "zeros" correspond to a reverse biased diode. According to the discussion above, this results in a large temperature increase, particularly then in the beginning of the modulator. When the voltage then is changed to a lower value, corresponding to a transmitted "one", an optical pulse out of the diode is achieved. Instead of a sharp flank, reflecting the difference in externally applied voltage, a slow building-up process is achieved; only after a certain period of time the component has approached a constant value of the optical power level for the "one". This clearly restricts the bandwidth of the transmission medium.

It is an object of the present invention to provide an electro-absorption modulator with improved performance.

It is a further object of the invention to provide an electro-absorption modulator in lack of problems that arise because of the strong temperature dependence of the band gap in the core of the modulator.

It is in this respect a particular object of the invention to provide an electro-absorption modulator that provides an optical pulse with short rise time when the voltage over the modulator is reduced.

It is yet another object of the invention to provide a method in manufacturing of said electro-absorption modulator.

Further objects of the present invention will be apparent from the specification below.

According to a first aspect of the present invention, an electro-absorption modulator (EAM), of the kind that includes a waveguide, for modulation of light, is provided, comprising a waveguide core, a waveguide cladding and an electrode, the modulator being arranged to modulate light launched into the modulator as a response to a voltage being applied to the electrode. The modulator is characterized in that the width and/or thickness of the waveguide core are/is varying along the length of the modulator in such a way that the width is smaller in the portion of the modulator where the light is intended to be input, for the purpose of reducing the absorption of the modulator there.

This variation is particularly arranged so that a mainly uniform photo current distribution, and thus temperature distribution, is achieved along the length of the modulator, for the purpose of reducing the thermally dependent, optical rise time of the modulator.

The electro-absorption modulator is preferably arranged to be used for intensity modulation of digital signals for fiber optic transmission. It may be monolithically integrated with a DFB laser (Distributed Feedback Laser) on a semiconductor substrate and manufactured using any of the material systems InP/InGaAsP, InP/InGaAIAs or GaInAs/AlGaAs.

The waveguide core may be of bulk or quantum well structure and the waveguide may be formed as a buried waveguide or as a, socalled, ridge waveguide.

According to a second aspect of the present invention there is provided a method in manufacturing of an electro-absorption modulator (EAM) according to the first aspect.

To manufacture a waveguide core with a varying width along the length of the modulator, so-called tapered photo-lithography masks, or selective etching may be used. If a waveguide core with quantum well structure is manufactured, inactive so-called SCH (Separate Confinement Heterostructure) layers in the quantum well structure may be etched selectively.

To manufacture a waveguide core with a varying thickness along the length of the modulator, SAE (Selective Area Epitaxy) or partially making the waveguide core thinner, through masking and etching, may be used.

An advantage of the present invention is that intensity modulation can be performed faster, which gives a higher transmission capacity.

BRIEF DESCRIPTION OF THE DRAWINGS

The invention is described in detail hereinbelow with reference to the accompanying Figures, which are given by way of illustration only, and thus are not limitative of the present invention.

FIG. 3 illustrates estimated relative absorption per length unit as a function of longitudinal position coordinate for a known modulator with a constant waveguide width, and for a modulator with a varying width ("tapered" structure) according to a preferred embodiment of the present invention.

FIG. 4 illustrates the main steps in a so-called BH (Burried Heterostructure) process in manufacturing of an electro-absorption modulator with varying waveguide width according to a preferred embodiment of the present invention.

FIG. 5 illustrates the main steps in a process using selective etching in manufacturing of an electro-absorption modulator with varying waveguide width according to an alternative, preferred embodiment of the present invention.

DETAILED DESCRIPTION OF EMBODIMENTS

In the following description, for purposes of explanation and not limitation, specific details are set fourth, such as particular applications, techniques, methods etc. in order to provide a thorough understanding of the present invention. However, it will be apparent to one skilled in the art that the present invention may be practiced in other versions that depart from these specific details. In other instances, detailed descriptions of well-known methods, protocols, devices or circuits are omitted so as not to obscure the description of the present invention with unnecessary details.

Figure 1:
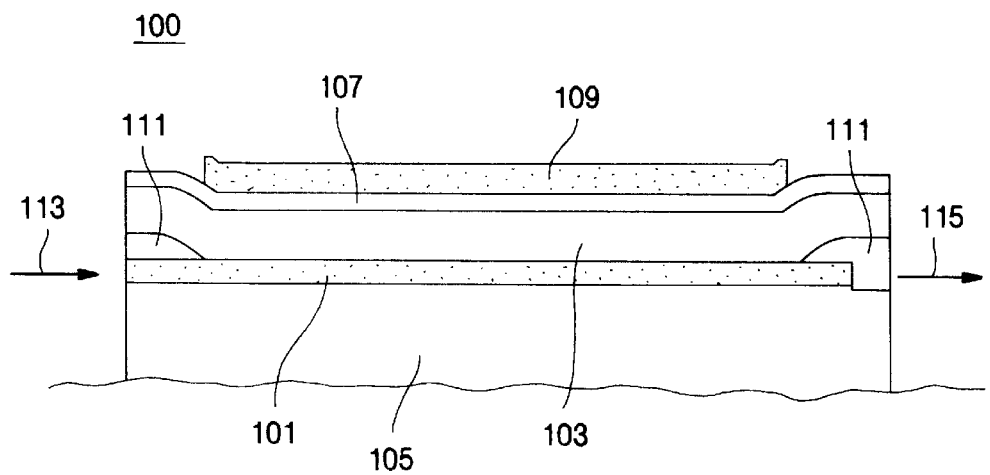
FIG. 1 illustrates, in cross section, an electro-absorption modulator according to prior art.

Referring to FIG. 1, a previously known EAM component 100 of a semiconductor material, normally InP/InGaAsP, a waveguide with a waveguide core 101 of bulk or quantum well structure, called i layer, whose refractive index is higher than that of the surrounding. For launched light at a wavelength of 1.3 or 1.55 $\mu$m, the core shall typically consist of a semiconductor material such as InGaAsP for bulk structure, or alternating layers of InGaAsP and possibly InP for quantum well structure. The core is typically slightly doped or not doped at all. Above the core there is a p-doped InP layer 103 and below the core there is an n-doped InP layer 105. Thus, this structure constitutes a p-i-n diode. Alternatively, the upper layer is n-doped and the lower layer p-doped.

On both sides of the wavelength core there is InP, which may be doped or undoped (not shown in FIG. 1); most usually this material consist of semi-isolating InP. Above the upper cladding layer 103 there is a contact layer 107, on which an electrode 109 is formed. Layer 111 of semi-isolating InP may also be formed between the core 101 and the upper cladding layer 103 in front of and behind the electrode 109, e.g., for isolating purposes. The width of the waveguide core is typically about 1 $\mu$m (for single mode waveguides).

Laser light 113 is launched into the modulator 100 from left-hand side in FIG. 1 and the modulated light 115 is output from the modulator to the right in said FIG. The attenuation through the modulator depends on the voltage being applied on the electrode 109. If the p-i-n diode is reverse biased a strong electrical field over the i layer 101 arises. This will then cause absorption of a large portion of the injected laser light 113. This is well known and is called electro-absorption. If the core consists of bulk material the phenomenon is named Franz-Keldysh effect and if the core consists of quantum wells the phenomenon is named Stark effect.

With a modulator length of 100–300 $\mu$m, and a thickness of the i layer between 0.1 and 0.4 $\mu$m (which are typical values), extinction ratios of 10–30 dB may be achieved provided that a voltage of the order of 2 V is applied on the electrode. With extinction is meant the relative difference between the optical output power from the modulator when a "one" is being transmitted (low or no voltage of the modulator electrode) and the optical output power when a "zero" is being transmitted (high negative voltage, one or several volts, on the electrode).

The value of the extinction depends on the difference in energy between the photons of the input light and band gap of the material in the i layer. The smaller this difference is, the larger change in absorption per applied unit voltage is achieved. It depends on that electro-absorption is a so-called resonant physical phenomenon.

It may be understood in the following way. By applying an electrical field over the i region the band gap of the material is reduced, which gives rise to an increased absorption, given the light energy being lower than the band gap energy. If for instance light of a wavelength of 1.55 $\mu$m (which corresponds to a photon energy of 0.8 eV) is coupled into the modulator, an i layer in the modulator with a band gap in the interval of 0.82–0.88 eV is typically chosen.

The light that is absorbed generates a photo current. Each absorbed photon creates an hole/electron pair, which is separated in the applied electrical field. Some holes and electrons do not have time to recombine before they reach the contacts, but in a well designed component a high external quantum efficiency (>90%) is achieved if the component is regarded as a photo diode.

In the beginning of the modulator the optical power is highest.

It means that the absorption is strongest there, when a reverse bias is applied on the electrode. The optical power in the waveguide is then decreasing, in a first approximation exponentially, to be very low in the final portion of the modulator. This indicates that the photo current density generated is largest in the beginning of the modulator (to the left in FIG. 1).

It will be appreciated that this may cause serious problems, particularly in the case one wishes to obtain high extinction ratios and at the same time inject a great amount of light into the EAM waveguide. The reason is local heating. With a reverse bias of several volts, and a photo current of 10–25 mA (corresponding to optical input powers of 8–20 mW for 1.55 $\mu$m wavelength; such optical powers are easily achieved when the EAM component is monolithically integrated with a DFB laser (Distributed Feedback Laser) on the same semiconductor substrate), a strong, local ohmic heating of the waveguide is obtained. The heat power per area unit generated is given by the local photo current density multiplicated by the voltage drop over the i layer. The heating gives rise to a locally increased temperature. With a thermal resistance in the order of 1000 K/W in a 25 µm long waveguide segment, local temperature increases of tens of Kelvins may easily be obtained. The temperature increase will though be nonuniformly distributed along the length of the modulator in a similar manner (though not identical) as the photo current density.

This may introduce serious problems in a digital transmission system, which is seen by study the following example. One wants to send one or several consecutive "ones", preceded by a long sequence of "zeros". These "zeros" correspond to a large reverse biasing voltage being applied over the i layer (which gives strong absorption). According to the reasoning above, this results in a large temperature increase, particularly in the beginning of the modulator (to the left in FIG. 1).

Figure 2:
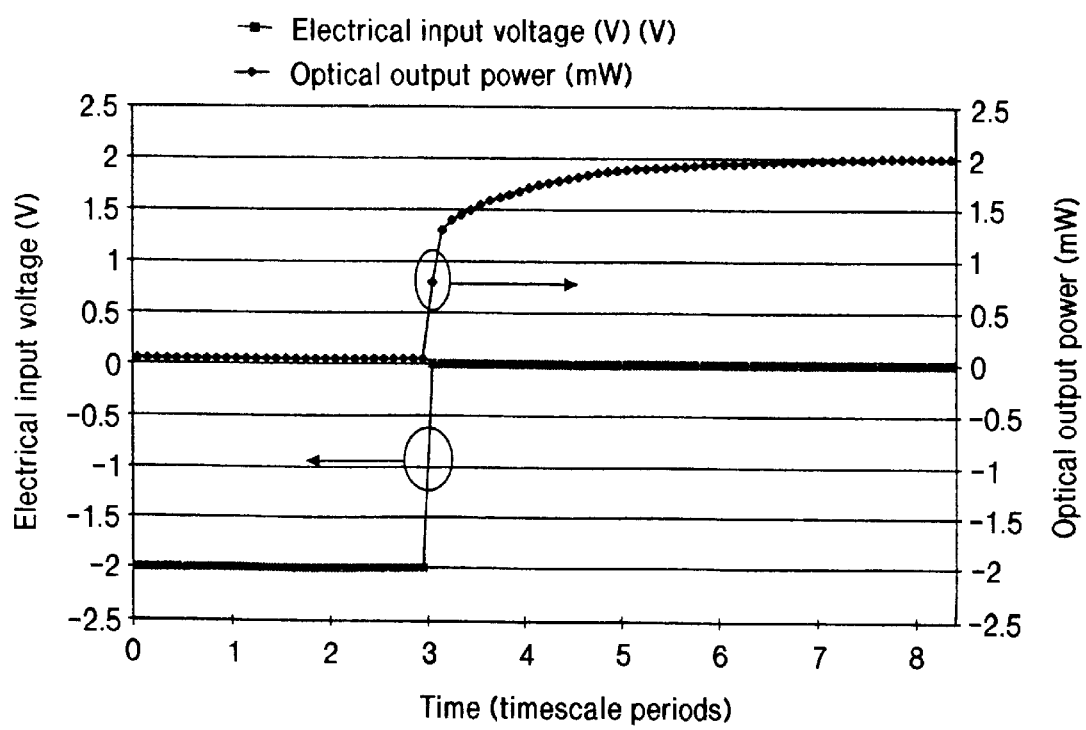
FIG. 2 illustrates an example of an optical output signal from the modulator of FIG. 1 as a response to an electrical input signal consisting of three "zeros" followed by five "ones".

When the voltage then is changed to a lower value, corresponding to a transmitted "one", an optical output pulse from the EAM component similar to the one in FIG. 2 is obtained.

FIG. 2 shows an example of electrical input signal (squares) and optical output signal (rhombs) for a modulator as a function of time. The input signal consists here of three "zeros" followed by five "ones". Strong heating occurs in the beginning of the modulator caused by a strong absorption per length unit at negative bias (−2 V).

Instead of a sharp flank, reflecting the difference in externally applied voltage, a slow building-up process is obtained. Only after a certain period of time the component has approached a constant value of the optical power of the "one". Note that for NRZ modulation with a transmission capacity of 10 Gb/s, a time scale period in the Figure corresponds to 0.2 nanoseconds.

The reason for this behavior is that the absorption coefficient, except of depending on the electrical field strength, also depends strongly on the temperature, which in turn depends on that the band gap of the semiconductor material is temperature dependent. After a long sequence of "zeros" the absorption remains thus high even when the applied reverse bias is reduced, since the temperature is higher and the band gap in the i layer is smaller. The time constant for the settling to the steady state in FIG. 2 is dependent on the precise arrangement of the waveguide and surrounding layers. One can easily show that it is quite possible to achieve a time constant of less than 1 ns, since the absorption is occurring within a very small region. None the less, this optical rise time is bandwidth limiting and it is desirable to decrease it, particularly to a considerable extent.

By realizing the problem as discussed above and by vary the optical confinement factor in the actively absorbing layer in such a way that a more uniform photo current distribution along the length of the modulator, an electro-absorption modulator according to the principles of the present invention is achieved.

Hereby, locally, largely increased temperatures are avoided, whereby an electro-absorption modulator with a shorter optical rise time is obtained.

Instead of having a constant width and thickness of the waveguide core, the width and/or the thickness are/is varied along the modulator. Closest the point where light is injected (to the left in FIG. 1) the waveguide core is preferably made narrow/thin whereas it preferably is made wider/thicker closest to the point where light is emitted from the waveguide core.

With this arrangement the optical confinement factor is varied, and thus the absorption. In the beginning of the modulator the optical confinement factor is small, whereby also the absorption is small. This means that the heat release is smaller there than if the modulator had been wider and/or thicker. Further on, when the optical power has decreased due to the absorption, the width and/or the thickness of the waveguide core of the modulator are/is increased, whereby the absorption is increased.

In this way a more uniform photo current distribution along the modulator is achieved, and one avoids largely increased temperatures locally within a small region closest to the optical injection point.

The absorptionen in an EAM modulator depends on the optical confinement factor and the field strength applied. It will have the following consequences.

If only the width of the waveguide core is varied, the applied voltage on the modulator electrode will give a relatively constant electrical field strength over the i layer of the modulator independent of its length. A certain dependence between field strength and width may, however, exist due to an increased electrical resistance and thus voltage drop if the waveguide is made narrow. In such circumstances, the desired effect is augmented.

To achieve a perfectly uniform absorption (and thus photo current distribution) along the modulator, the width of the waveguide core shall thus be increased so that the increase in confinement factor completely compensates the decrease in optical power, due to absorption, in such a way that the optical power in the core becomes constant along said core.

If only the thickness of the waveguide core is varied, also the field strength over the i layer will vary. A thin waveguide segment achieves high field strength (which gives strong absorption) and low optical confinement factor (which gives weak absorption). In other words, there are two counteracting effects present if the optical confinement factor is varied through varied waveguide thickness.

The absorption as a function of the core thickness has a maximum for some thickness (the limits of infinitely small thickness and infinitely large thickness, respectively gives zero absorption).

To achieve a more uniform absorption (and thus photo current distribution) along the modulator, the thickness of the waveguide shall thus be increased towards the modulator output if the thickness is smaller than the thickness corresponding to maximum absorption, which in practice most often would be the case.

An optimal variation of width and/or thickness may preferably be estimated numerically.

FIG. 3 shows estimated relative absorption per length unit as a function of longitudinal coordinate for a conventional structure with constant waveguide width, and for a structure with varying width, so-called tapered structure, according to the present invention. Light is injected at x=0 µm.

The waveguide consists of a quantum well structure (ten undoped quantum wells of InGaAsP surrounded by undoped InGaAsP-barriers with larger band gap than the wells). The modulator is in this example 180 µm long. The component has been reverse biased to a level where the material absorption is 500 cm$^{-1}$. The waveguide core of the conventional structure has a constant width of 1.0 µm, whereas the waveguide core of the inventive tapered (i.e. with a varying width along the waveguide) structure has a width that varies linearly from 0.5 to 1.2 µm. The thickness of the waveguide is in this example kept constant.

As can be seen in FIG. 3, a much more uniform, i.e., mainly uniform, distribution of the absorption along the modulator is achieved with the tapered structure. It leads to a more uniform temperature distribution, and prevents intense local heating in the beginning of the modulator.

Preferably, the electro-absorption modulator, according to the present invention, is intended for intensity modulation of digital signals for fiber optic transmission. It may be alone or monolithically integrated with a laser source.

Besides, if the EAM component is to be adapted for high bit rates, it has to be manufactured with low capacitance, i.e., with short length, since the capacitance together with the equivalent resistance of the electrical driving circuit affect the rise and fall times of the modulated light.

To manufacture an inventive modulator with varying width/thickness may be done in several ways. In the following, five examples of approaches will be discussed briefly, with reference to FIGS. 4 and 5.

The first method produces a waveguide core with varying width by using a tapered photolithography mask. The waveguide core is defined by conventional photolithography, for example contact lithography, projection lithography, E-beam lithography or similar, and subsequent etching. The photolithography mask to be used, shall, according to the present invention, be tapered, whereby also the waveguide core will be tapered.

Main steps in the process are visualized in FIG. 4, which Figure illustrates a so-called BH process (Burried Heterostructure), but the invention is applicable also to other, modified classes of laser/modulator processes, e.g., for manufacturing of ridge lasers. FIG. 4. shows I. waveguide core mask seen from above, II. cross sections along lines A—A and B—B in I. after masking but before etching, III. same cross sections after etching, and IV. same cross sections after completed process. In the Figure the reference numeral 41 denotes waveguide core, 42 denotes n-doped InP, 43 denotes p-doped InP, 44 denotes semi-isolating InP, 45 denotes electrode, and 46 denotes mask.

The second method produces a waveguide core with varying width by selective etching. By using a selective etch, preferably an wet etch, which etches waveguide core material, but not surrounding material, in combination with masking of waveguide segments which are not to be etched, a waveguide with different width in different segments is achieved. This gives discrete steps in waveguide width, but by repeating the etching step several times with masks of different lengths, a more continuous variation of the waveguide width is achieved.

FIG. 5. shows different main steps according to this alternative method for achieving waveguides with varying width. Thus, the Figure shows I. waveguide mask as seen from above, II. cross sections along lines A—A and B—B in I. after masking but before etching, III. same cross sections after etching, IV. same cross sections after selective etching, and V. same cross sections after completed process. In the Figure the reference numeral 51 denotes waveguide core, 52 denotes n-doped InP, 53 denotes p-doped InP, 54 denotes semi-isolating InP, 55 denotes electrode, 56 denotes waveguide mask and 57 denotes mask for selective etching.

The third method produces a waveguide core with varying width by selective etching away of inactive SCH (Separate Confinement Heterostrukture) layers, i.e., layers in the waveguide which have as a task to affect the optical confinement factor, which are, inter alia, used in quantum well structures.

The fourth method produces a waveguide core with a varying, tapered, thickness by using SAG (Selective Area Epitaxy). A mask of, e.g., silicon oxide or silicon nitride is placed on the structure before epitaxy of the waveguide core. The rate of growth, and thus the thickness of the waveguide core layer, the i layer, depends on the distance to the mask. With a suitable design of the mask, a layer with tapered thickness is achieved.

The fifth method produces a waveguide core with tapered thickness by partially making the core layer thinner. The varying thickness is achieved by making the core layer thinner (using masking and etching) within areas where the layer should be thin. This gives discrete steps in core layer thickness, but through repeating the step several times with different masks, one may achieve a more continuous variation of the waveguide core thickness.

A combination of two or more of the above described methods is obviously also applicable.

The invention is apparently not limited to the embodiments as described above and illustrated in the Figures, but may be modified within the scope of the appended claims. Particularly, the invention is obviously not limited as regards material, dimensions or manufacturing method of the electro-absorption modulator.

What is claimed is:

1. Electro-absorption modulator of waveguide type for modulation of light, comprising a waveguide core, a waveguide cladding and an electrode, the modulator being arranged to modulate light launched into the modulator in response to a voltage applied on the electrode, wherein a thickness of the waveguide core varies along a length of the modulator in such a way that the thickness is smaller near an end of the modulator where the light is input into the modulator, for the purpose of reducing the absorption of the modulator there.

2. Electro-absorption modulator as claimed in claim 1, wherein the modulator modulates an intensity of digital signals transmitted via fiber optics.

3. Electro-absorption modulator as claimed in claim 1, wherein the modulator is monolithically integrated with at least one DFB (Distributed Feedback) laser on a semiconductor substrate.

4. Electro-absorption modulator as claimed claim 1, wherein the modulator is made of at least one of the materials InP/InGaAsP, InP/InGaAIAs and GaInAs/AlGaAs.

5. Electro-absorption modulator as claimed in claim 1, wherein the waveguide core has a bulk structure or a quantum well structure.

6. Electro-absorption modulator as claimed in claim 1, wherein the waveguide is formed as a buried waveguide or a ridge waveguide.

7. Electro-absorption modulator as claimed in claim 1, wherein the variation is arranged to yield a mainly uniform photo current distribution and thus temperature distribution along the modulator, for the purpose of reducing the thermally dependent, optical rise time of the modulator.

8. Method as claimed in claim 7, wherein the variation is formed so that a mainly uniform photo current distribution and thus temperature distribution along the modulator is achieved, for the purpose of reducing the thermally dependent, optical rise time of the modulator.

9. Method as claimed in claim or 7, wherein the modulator is formed monolithically integrated with at least one DFB (Distributed Feedback) laser on a semiconductor substrate.

10. Method as claimed in claim 7, wherein the modulator comprises at least one of the materials InP/InGaAsP, InP/InGaAIAs and GaInAs/AlGaAs.

11. Method as claimed in claim 7, wherein the waveguide core is formed with a bulk structure or a quantum well structure.

12. Method as claimed in claim 7, wherein the waveguide is formed as a buried waveguide or a ridge waveguide.

13. Method for manufacturing an electro-absorption modulator of waveguide type for modulation of light, comprising a waveguide core, a waveguide cladding, and an electrode, the modulator being arranged to modulate light launched into the modulator in response to a voltage applied on the electrode, the method comprising the step of forming the modulator with a thickness that varies along a length of the modulator in such a way that a smaller thickness is obtained in a portion of the modulator where the light is intended to be input, for the purpose of reducing the absorption of the modulator there.

14. Method as claimed in claim 13, wherein the waveguide core is formed using SAE (Selective Area Epitaxy).

15. Method as claimed in claim 14, wherein the thickness varies continuously along the length.

16. Method as claimed in claim 13, wherein the step of forming comprises selectively reducing the thickness of the waveguide core through masking and etching.

* * * * *